US008364747B2

(12) United States Patent
Cheng et al.

(10) Patent No.: US 8,364,747 B2
(45) Date of Patent: Jan. 29, 2013

(54) CLIENT/SERVER REQUEST HANDLING (75) Inventors: Michael Cheng, Austin, TX (US); Stephen James Cocks, Winchester (GB); Robert Howard High, Jr., Round Rock, TX (US); Ian Robinson, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 3434 days.

(21) Appl. No.: 10/322,101

(22) Filed: Dec. 17, 2002

(65) Prior Publication Data

US 2004/0117453 A1 Jun. 17, 2004

(51) Int. Cl.
*G06F 15/16* (2006.01)
(52) U.S. Cl. ......... 709/203; 709/201; 709/202; 709/212
(58) Field of Classification Search ........................ None
See application file for complete search history.

(56) References Cited

U.S. PATENT DOCUMENTS

| 6,237,023 | B1 * | 5/2001 | Yoshimoto | 709/203 |
| 6,801,914 | B2 * | 10/2004 | Barga et al. | 707/674 |
| 7,103,640 | B1 * | 9/2006 | Overton et al. | 709/217 |
| 2002/0032661 | A1 * | 3/2002 | Schuba et al. | 705/64 |
| 2002/0046170 | A1 * | 4/2002 | Gvily | 705/42 |
| 2003/0061365 | A1 * | 3/2003 | White et al. | 709/229 |
| 2004/0215695 | A1 * | 10/2004 | Hsu et al. | 709/201 |

* cited by examiner

*Primary Examiner* — John Follansbee
*Assistant Examiner* — Dhairya A Patel
(74) *Attorney, Agent, or Firm* — Stephen J. Walder, Jr.; Jeffrey S. LaBaw (57) ABSTRACT

The present invention provides a method, apparatus and computer program product which enables a target service to provide operations which behave, on a per operation basis, in a way appropriate to the type of client that requested the operation to be performed. As a result the target service can provide operations which behave differently for different clients. Further the client can obtain details of the behavior characteristics of the operations, according to its type, at runtime and act appropriately in the event of the request being timed out or resulting in a communication failure. For example, the client middleware can take action to re-issue a timed out request if the behavior characteristic for that operation indicates that multiple invocations of the operation will yield the same result.

27 Claims, 7 Drawing Sheets

CLIENT/SERVER REQUEST HANDLING

FIELD OF THE INVENTION

The present invention relates to Client/Server request processing and more particularly to handling of time out and communication failures in Client/Server requests.

BACKGROUND TO THE INVENTION

It is a goal of many enterprise distributed systems to provide 24×7 availability (24 hours, 7 days a week) because unplanned downtime in such systems is likely to result in lost custom/business. For example, if a bank's ATM client loses contact with the bank server system such that customers cannot obtain cash, the bank is likely to lose customers. Similarly if an insurance company operative cannot respond to a customer enquiry because the operative's client workstation has lost contact with the insurance company server system, the insurance company is likely to lose customers. As a result an enterprise distributed system that requires 24×7 availability needs to be able to deal with failures such as the temporary unavailability of a server or a resource such as a database, which is accessed via a server.

For example, if a client makes a request for a target service in a server to perform an operation and the requested operation fails, the client has several options. For example it may: re-issue the request to the same or an equivalent target service to perform the operation; fail and return an error to the user; or ignore the error. The option selected may depend on what permanent effects the failed operation had. For example, if the failed operation succeeded to the point of making permanent updates to a database, the client should not re-invoke the request. Alternatively if the failed operation is idempotent the client may safely re-issue the request anyway since multiple invocations of an idempotent operation will always yield the same result.

As a result, for client/server applications which can potentially cross business boundaries, it is an advantage if the client knows, or receives, for example, an indication of whether or not operations of a target service are idempotent. Such knowledge can result if idempotency is part of the contract between the target service and client.

BEA's WebLogic Server provides one solution to this problem for its J2EE application server (WebLogic Server is a registered trade mark of BEA Systems Inc. and J2EE is a trade mark of Sun Microsystems Inc.). This solution enables a target service to be statically defined (labelled) as providing operations all of which are idempotent. This information is then made available to the client so that it can obtain this information before sending a request.

However it is not always desirable for the idempotency of the operations of a target service to be statically defined. For example, a target service may wish to process a request for an operation differently depending on the capability and requirements of the invoking client, such that an operation may be idempotent for one type of client and not for another. Further a given service may provide support for many different operations where some are idempotent and others are not.

SUMMARY OF THE INVENTION

Accordingly, according to a first aspect the present invention provides a method for handling client/server requests by a client process, the method comprising the steps: intercepting a request from a client application, said request relating to a target service which provides an operation; adding an identifier indicating a client type for said client process to data to be flowed with said request; intercepting a response to said request, said response including a behavior characteristic associated with said client type for said operation, said behavior characteristic indicating whether or not multiple invocations of said operation will yield the same result; and obtaining said behavior characteristic from said response.

According to a second aspect the present invention provides a client data processing apparatus for handling client/server requests, the apparatus comprising: means for intercepting a request from a client application, said request relating to a target service which provides an operation; means for adding an identifier indicating a client type for said client process to data to be flowed with said request; means for intercepting a response to said request, said response including a behavior characteristic associated with the client type for said operation provided by the target service, said behavior characteristic indicating whether or not multiple invocations of said operation will yield the same result; and means for obtaining said behavior characteristic from said response.

According to a third aspect the present invention provides a computer program product comprising instructions which, when executed on a data processing host, cause the host to carry out a method according to the first aspect.

As a result a client process can obtain the behavior characteristics associated with one or more operations of a target service. The client application request on which the behavior characteristics are returned is preferably either to obtain a location for the target service or to create or find an instance of a target service. This enables the client to know the behavior of operations before calling them.

A single behavior characteristic could be obtained which characterises behavior of all operations. However, preferably a separate behavior characteristic is obtained for each operation, so that different operations can observe different behavior characteristics.

Preferably, having obtained behavior characteristics for one or more operations of a target service the client process further intercepts future requests for an operation of the target service and adds the identifier, indicating the client type, to the data flowed with the request. This enables the target service to become aware of the client type when processing the operation. Further if either a response to the request is not received within a specified time limit, or a response is received which indicates that a response to the operation will not be received from the target service (for example a communication failure is received), the client process can consider the request to have timed out and use the behavior characteristic previously obtained for the timed out operation in deciding how to continue processing. For example, if the behavior characteristic indicates that multiple invocations of the operation will yield the same result the client process can re-issue the request to the target service in the same or a different server. If the operation request is sent to a different server process the client process must first find that process.

Note that the identifier which indicates the client type can be, for example, a string. The types that are indicated will depend on the application. For example, the client type can be used to differentiate clients as either administrators or users. In another example the client type could identify a particular user or application.

According to a fourth aspect the present invention provides a method for handling client/server requests by a server process, the method comprising the steps: receiving a request from a client process, the request relating to a target service and including an identifier indicating a client type for said client process; obtaining a behavior characteristic, associated with said client type, for an operation provided by said target service; and adding details of said behavior characteristic for said operation to a response to said request.

According to a fifth aspect the present invention provides a server apparatus for handling client/server requests, the apparatus comprising: means for receiving a request from a client process, the request relating to a target service and including an identifier which indicates a client type for said client process; means for obtaining a behavior characteristic, associated with said client type, for an operation provided by said target service; and means for adding details of said behavior characteristic for said operation to a response to said request.

According to a sixth aspect the present invention provides a computer program product comprising instructions which, when executed on a data processing host, cause the host to carry out a method according to the fourth aspect.

This enables a server to return, with a response to a request from a client, the behavior characteristics associated with one or more operations of the target service. The client request could be, for example, to obtain a location for the target service, to create or find an instance of a target service, or to carry out an operation of the target service.

Optionally, for example, if the request is to obtain a location of the target service this request may be handled by a naming service, which exists in a different server process from the target service.

Alternatively if the request is received in the server process in which the target service resides, the server process will also be enabled to obtain an indication of the client type from a client application request for the target service to perform an operation. This enables the server process to provide, on request from the target service performing the operation, either an indication of the behavior characteristics associated with the client type for the operation, or the client type received with the request. Thus when the target service is performing the operation it can behave appropriately for the client type.

However, the server process which returns the behavior characteristics associated with one or more operations of the target service according to the fourth aspect of the present invention, can be different from the server process in which the target service resides. Accordingly, according to a seventh aspect, the invention provides a method for handling a client/server request by a server process, the method comprising the steps: intercepting a request, from a client process, for a target service to perform an operation; obtaining an identifier indicating a client type for said client process from said request; receiving a request from said target service to obtain information which enables said target service to behave according to a behavior characteristic for said operation and associated with said client type; and returning said information to said target service According to an eighth aspect, the present invention provides a A server apparatus for handling client/server requests, the apparatus comprising: means for intercepting a request from a client process for a target service to perform an operation; means for obtaining an identifier which indicates a client type for said client process from said request; means for receiving a request from said target service to obtain information which enables said target service to behave according to a behavior characteristic for said operation and associated with said client type; and means for returning said information to said target service.

According to a ninth aspect, the present invention provides a computer program product comprising instructions which, when executed on a data processing host, cause the host to carry out a method according to the seventh aspect.

The information requested by the target service could be, for example, the client type or an indication of the behavior characteristic for the operation and associated with the client type.

The present invention therefore enables a target service, accessible by different types of client, to indicate to each type of client the behavior characteristics associated with its operations for that type of client. As a result the target service can provide different behavior characteristics for its various operations and/or type of client. Further a client process can act according to the behavior characteristics in the event that an operation request receives a communication failure or is timed out.

BRIEF DESCRIPTION OF THE DRAWINGS

The invention will now be described, by way of example only, with reference to a preferred embodiment thereof, as illustrated in the accompanying drawings, in which.

DESCRIPTION OF THE PREFERRED EMBODIMENT

Figure 1:
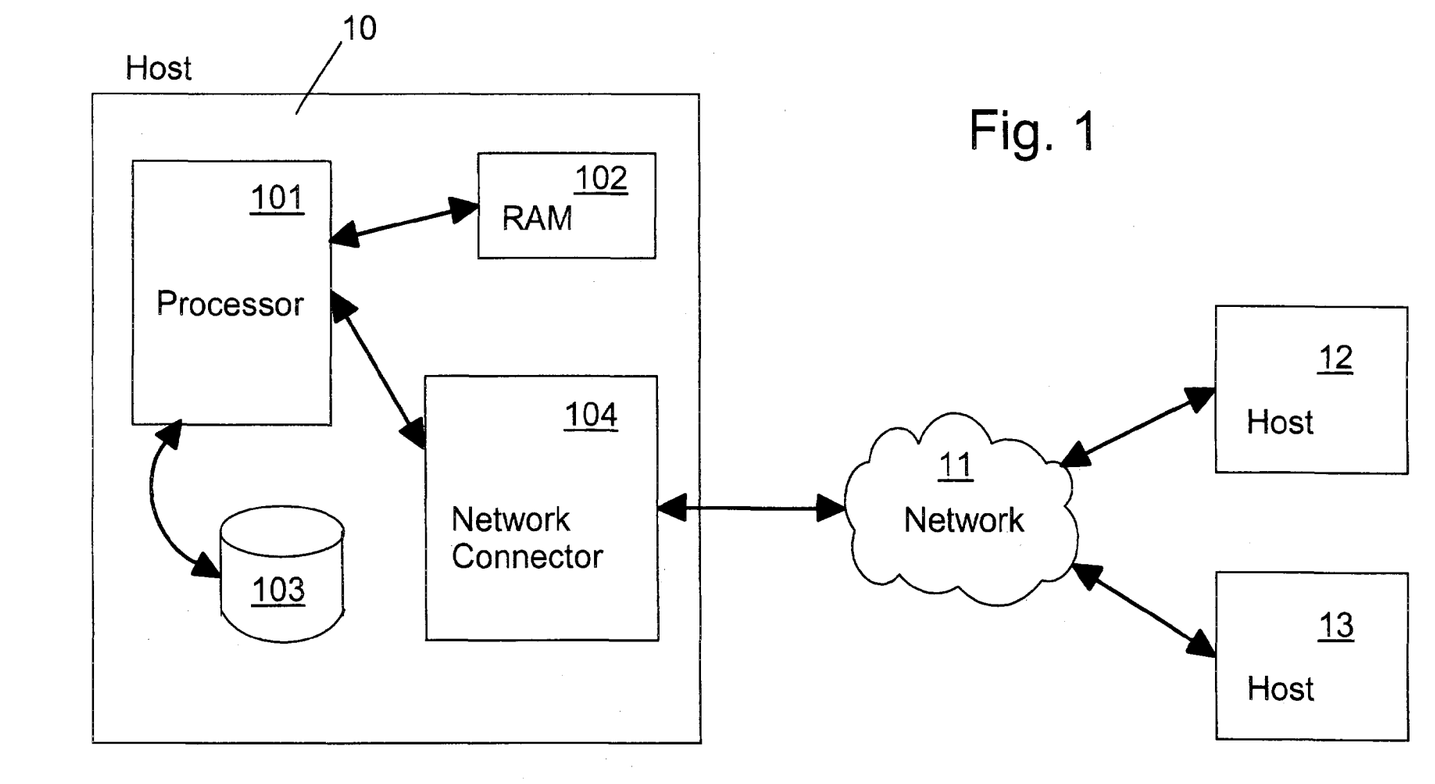
FIG. 1 is a schematic diagram of a data processing environment in which the preferred embodiment of the present invention can be advantageously applied.

FIG. 1 is a schematic diagram of a data processing environment in which the preferred embodiment of the present invention can be advantageously applied; In FIG. 1, a client/server data processing host 10 is connected to other client/server data processing hosts 12 and 13 via a network 11, which could be, for example, the Internet. Each host comprises an appropriate client/server implementation of client/server software. For example host 10 could comprise a client implementation and hosts 12 and 13 server implementations of the J2EE architecture, the server implementations providing support for target services which provide operations/methods for which the client can make requests. For example host 12 may provide support for one set of target services and host 13 may provide support for the same or a different set of target services. Further, one server implementation comprises implementation of a naming and directory service which the client may use to obtain the location of the target services it wishes to call. Note that the naming and directory service may serve a plurality of client and server hosts. Client/server 10 has a processor 101 for executing programs that control the operation of the client/server 10, a RAM volatile memory element 102, a non-volatile memory 103, and a network connector 104 for use in interfacing with the network 11 for communication with the other client/servers 12 and 13.

Figure 2:
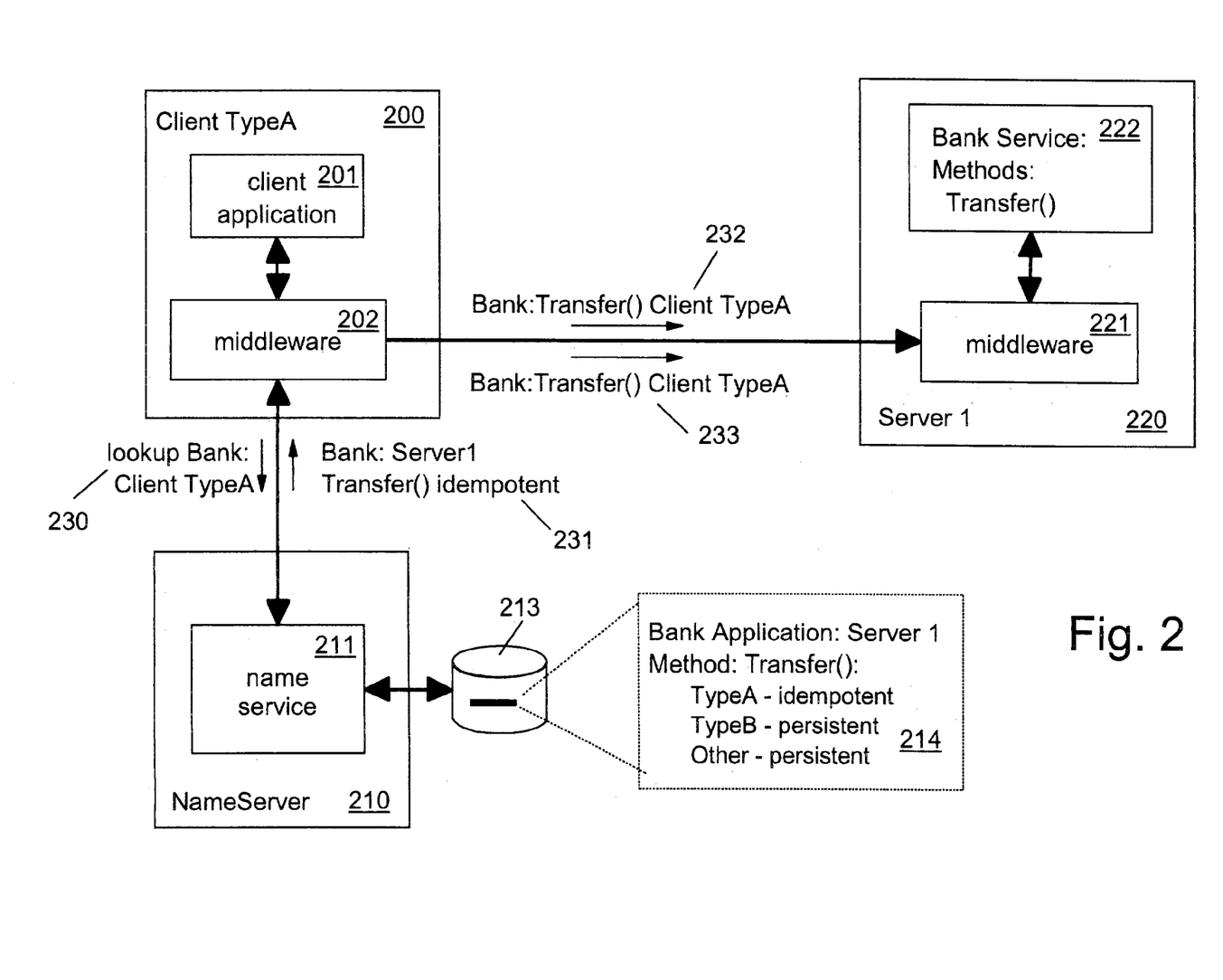
FIG. 2 is a schematic diagram showing participants, and example flows between those participants, in a preferred embodiment of the present invention.

FIG. 2 is a schematic diagram showing participants in the preferred embodiment of the present invention, and examples of basic flows between those participants. The figure shows a client process (200), a name server process (210) and an application server process, Server 1 (220). The client process comprises a client application (201) and a client middleware component (202). The client application wishes to find an implementation of a Bank service/application (222) and then use that service to issue a transfer request. To do this the client application first calls the name server process to obtain details of the location of a Bank service. Before the call leaves the client process, the middleware intercepts it and adds to it detail of the client type, which is "TypeA". The request (230) then proceeds to the name server where it is processed by the name service (211). As part of processing the request, the name service, which is part of the middleware, first obtains the client type from the request and then obtains the location of the Bank service and behavior characteristics for the client type from details (214) held in a database (213). A response (231) is then returned to the client application including the location of the Bank service and behavior characteristics for client "TypeA" for each operation provided by the Bank service, which in this example is a single Transfer( ) operation with a behavior characteristic of idempotent. On return to the client process the middleware retains the behavior characteristics information and passes the location of the Bank service to the client application. Now when the client application issues a request to the Bank service, the client middleware (202) intercepts the request (232). It then adds detail of the client type to the request and starts a timer before allowing the request to proceed to the Bank service in Server 1 (220). When the request arrives at Server 1 the middleware (221) intercepts it and obtains the client type, before passing the request on to the Bank service (222). The Bank service (222) then asks the middleware for the behavior characteristic associated with the client type so that it can behave accordingly. Now, if processing of the Transfer( ) operation takes longer than the timer started by the client middleware, or a communication failure is received, the operation is timed out by the client. In this example the behavior of the operation is idempotent for the client type and so, in this event, the client middleware re-issues the request (233) to the Bank Service. Note that the operation could be timed out for a variety of reasons, for example, a network failure, a failure of the server in which the target service is located, or an attempt by the operation to access a database which is locked by another process. Further note that if the client times out a request, the client middleware can find and issue the operation request to an equivalent Bank Service located in a different server.

Note that this example does not necessarily include all necessary flows. For example the client application may have to create an instance, or find an existing instance, of a component/object of the target service which it can request to perform the Transfer( ) operation. Further, if this is required, in an alternative embodiment the behavior characteristics can be returned by Server 1 with the response to the create/find request rather than by the name service in response to the lookup request. If this alternative is used the client type need not be flowed with the lookup request to the name service.

In the preferred embodiment the detail of the client type is added to a client application request transparently to the client application. This is achieved using an implicit context which is added to the request by middleware before leaving a client/server and then removed by middleware on receipt of the request. Such an implicit context for non-functional qualities of service is common to J2EE architecture and CORBA (Common Object Request Broker, Architecture). In these architectures the implicit context comprises service contexts which are used by various middleware services to exchange information relevant to the request. For example the client transaction service may add a transaction service context to the request which comprises details of a transaction under which a method request is made. In the preferred embodiment a behavior service context is defined which is used by the client and server middleware to implement the present invention. The behavior service context comprises:

--- string client_application_identifier
array of <behavior_characteristics_data>:
    string method_identifier
    integer behavior_type

---

Detail of the client type is provided by the client_application_identifier which is a string established in the client process to indicate its type. It is used when determining the behavior characteristics to use for the client process. How the identifier is composed is largely application-specific and may, for example, identify: a particular client; a particular class of client; a particular client application; a particular type of client application; or a particular user. Whichever is chosen it will be clear to the skilled person how to select a suitable string. In alternative embodiments the client_application_identifier could be, for example, an integer, a set number of bytes, or even a bit, with each value being an indication of a different client type. The embodiment chosen may depend on the number of different client types supported.

The behavior characteristics data is an array of elements in which each element contains a method_identifier string which identifies one or more operations and a behavior_type integer which identifies the failure type associated with those methods. For example a behavior type could be: 0 for an idempotent failure and 1 for a non-idempotent failure. Note that if the method_identifier indicates all methods such that all methods are associated with a single behavior type, the array of behavior_characteristics data can be replaced by a single behavior_type integer.

The methods followed by the middleware participants shown in FIG. 2, using the behavior service context, are now described with reference to FIGS. 3 to 7.

Figure 3:
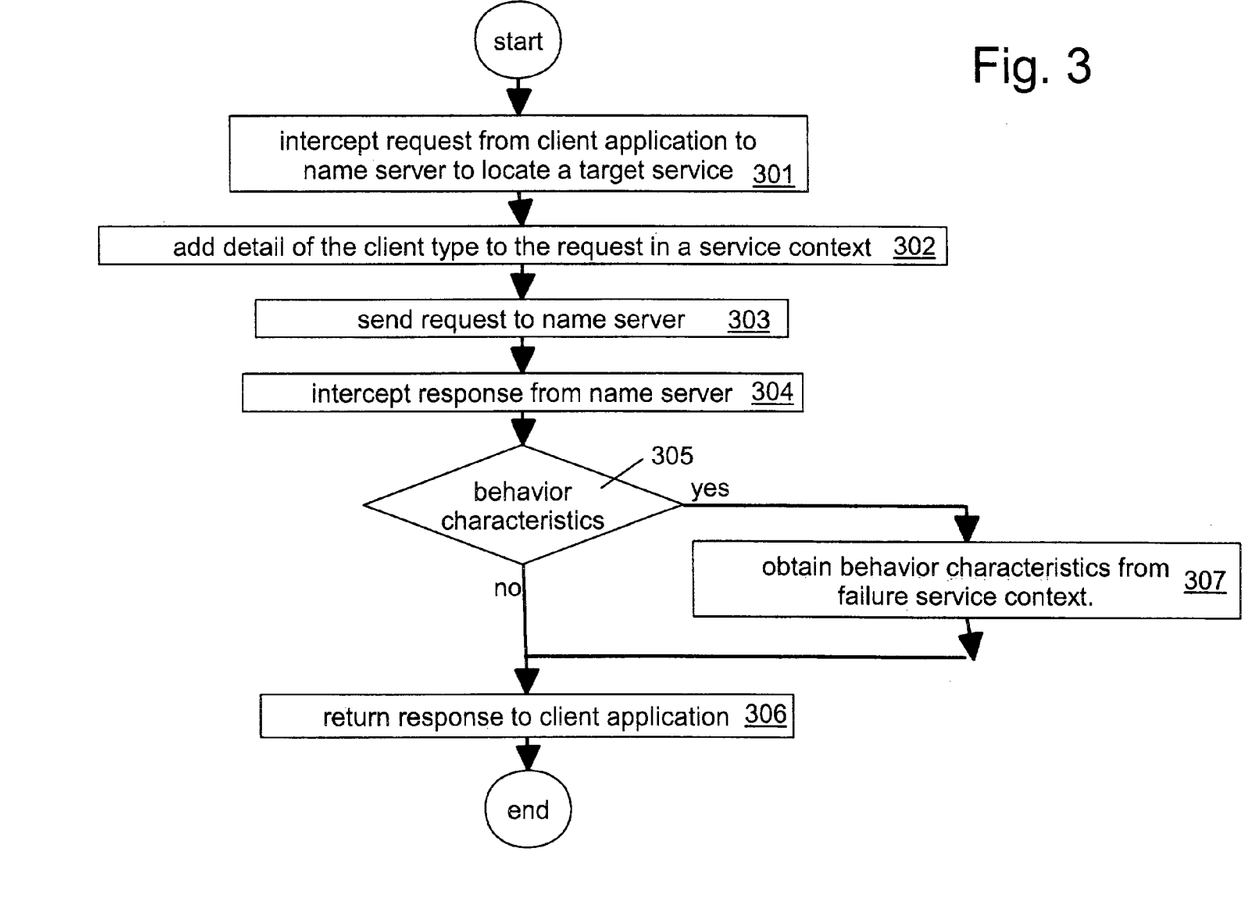
FIG. 3 is a flow chart of the method followed by the middleware of a client process when processing an initial lookup request from a client application for a target service.

FIG. 3 is a flow chart of the method steps followed by middleware (202 of FIG. 2) of a client process (200 of FIG. 2) when processing an initial lookup request from a client application (201 of FIG. 2), for a target service (222 of FIG. 2). At step 301 a client application request to look up the location of a target service is intercepted by the client middleware. At step 302 detail of the client type is added to the request in a behavior service context which is part of the implicit context. For example, the client type for the client could be configured with the client middleware. At step 303 the request is sent (flow 230 of FIG. 2) to the name server (210 of FIG. 2). Sometime later the response (flow 231 of FIG. 2) to the lookup request is received and this is intercepted by the middleware at step 304. At step 305 a check is made to see if behavior characteristics have been included in a behavior service context as part of the implicit context included with the response. If so, at step 307 the behavior characteristics are obtained. Finally at step 306, whether or not behavior characteristics were received, the response to the lookup request is returned to the client application (201 of FIG. 2). Note that alternatively, if behavior characteristics are returned from a create/find request rather than on a lookup request, the request intercepted at step 301 would be a create request or a find request and the response at step 304 would be received from the application server in which the target service is located.

Figure 4:
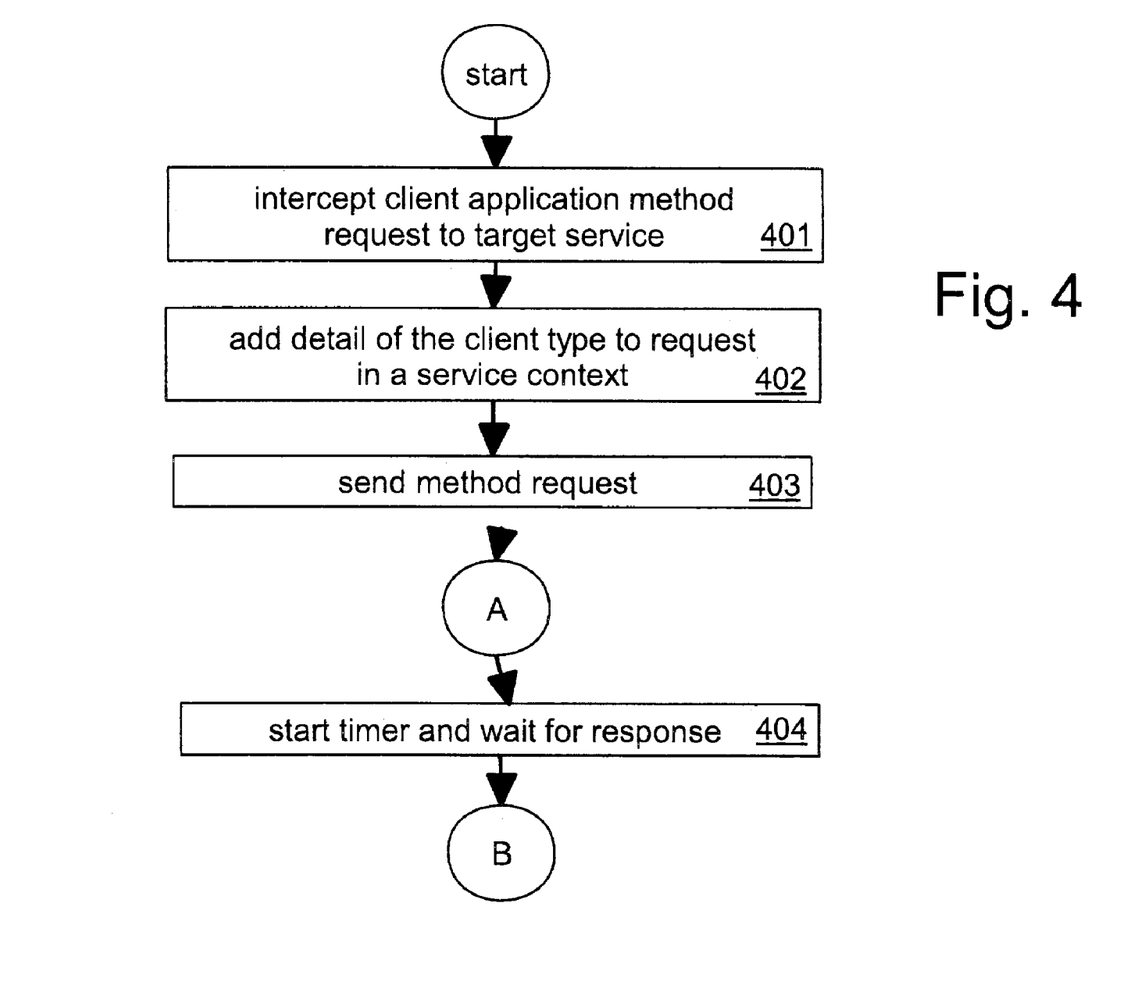
FIG. 4 is a flow chart of the method followed by the middleware of a client process when processing a request from a client application to a target service.

FIG. 4 is a flow chart of the method steps followed by middleware (202 of FIG. 2) of a client process (200 of FIG. 2) when processing a request, from a client application (201 of FIG. 2) to a target service (222 of FIG. 2), which is subsequent to obtaining the behavior characteristics according to FIG. 3. At step 401 a request from the client application to the target service is intercepted and at step 402 detail of the client type is added to the request, in a service context as part of the implicit context. At step 403 the client application request is sent (flow 232 of FIG. 2) to the target service and at step 404 the client middleware starts a timer, for a specified time interval, while waiting for the response to the client application request. When a response is received or the timer expires processing continues at step 501 of FIG. 5.

Figure 5:
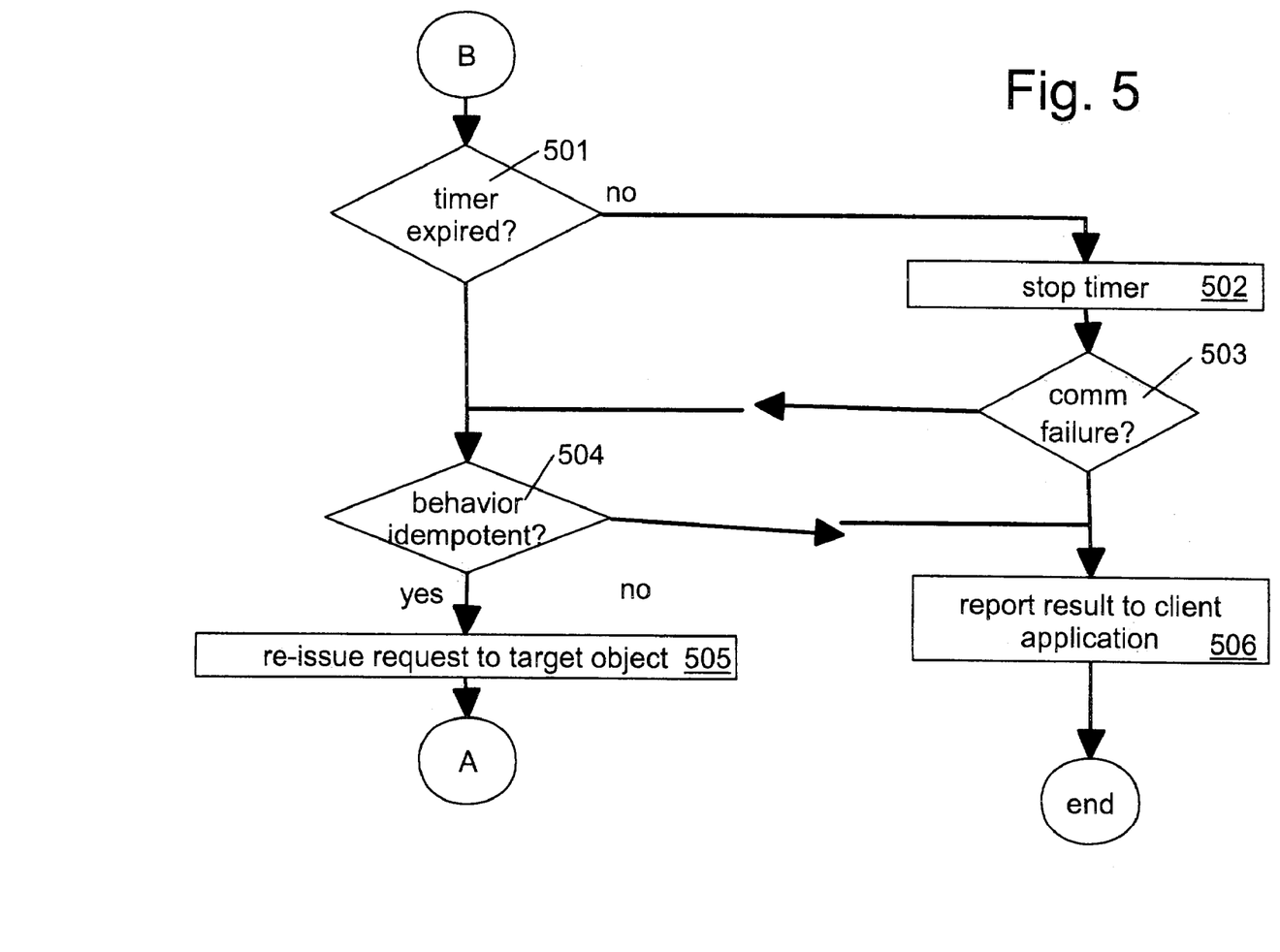
FIG. 5 is a flow chart of the method followed by the middleware of a client process when handling a response to, or a time out of, a request from a client application to a target service.

FIG. 5 is a flow chart of the method steps followed by middleware (202 of FIG. 2) of a client process (200 of FIG. 2) when processing a response to, or a timeout of, a target service request which was processed according to FIG. 4. At step 501 a check is made to see if the timer started at step 404 of FIG. 4 has expired. If the timer did not expire a response to the request has been received and so the timer is stopped at step 502 and a check is made at step 503 to see if the response indicates a communication failure which indicates that a response will not be received from the target service. If this is not the case the response is passed back to the client application at step 506. If the response indicated a communication failure or if the timer expired, the request sent at step 403 of FIG. 4 is considered to have timed out. As a result the behavior characteristics are checked at step 504 to see if the requested operation called is idempotent. If the operation is not idempotent the error is returned to the client application at step 506, but if the operation is idempotent the client middleware at step 505, retries the request to the target service (222 of FIG. 2). This retry is done without the knowledge of the client application and once the retry request has been issued processing returns to step 404 of FIG. 4. Note that this method preferably has a retry count such that if an operation is idempotent a request is only re-issued the number of times specified in the retry count after which time the failure is reported to the client application. Further note that the specified time interval can be different for different client processes and can vary, for example, according to the number of retries completed. Further note that in the event of a communication failure the middleware may wait a pre-determined time interval before re-issuing the request. Further note that other embodiments could provide support for only the timer expired time out or only the communication failure timeout. Preferably the retried request is made to the same target service as the original request, alternatively it can be made to a different instance of the target service in a different server process.

Figure 6:
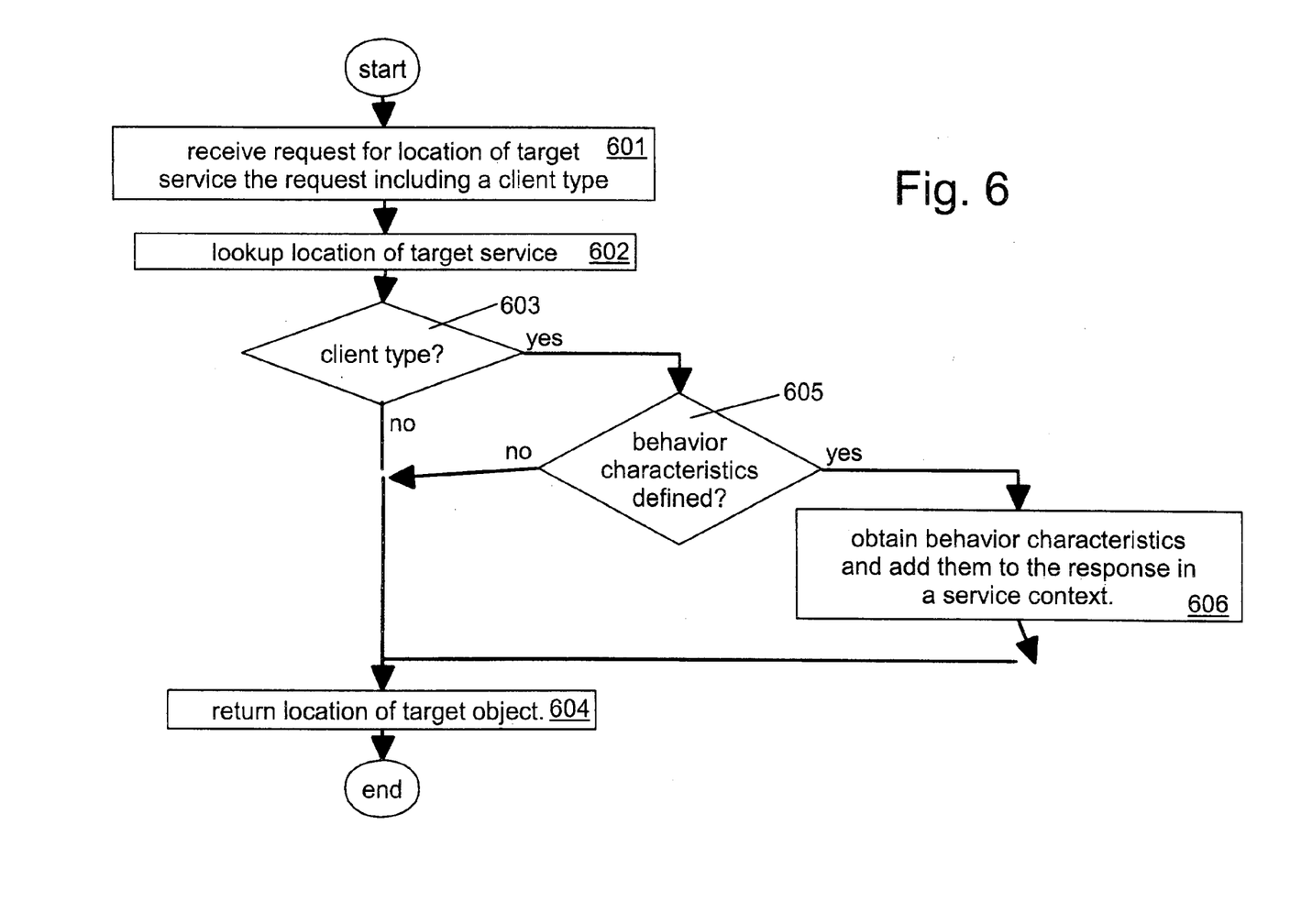
FIG. 6 is a flow chart of the method followed by a name service of a server process when processing a lookup request for a target service.

FIG. 6 is a flow chart of the method followed by the name service (211 of FIG. 2) of a name server process (210 of FIG. 2), when processing a lookup request for a target service, such as the request sent at step 303 of FIG. 3. Note that the name service is implemented by middleware. At step 601 the request to lookup the location of a target service is received. At step 602 the location of the target service is obtained, for example, from a database (213 of FIG. 2) configured with the locations of various target services. At step 603 a check is made to see if detail of the client type was included with the request. If detail of the client type is not included, the request may, for example, have been received from prior art client process or a client process which is an embodiment of the present invention but is obtaining behavior characteristics on an initial create/find of the target service. If a client type is not included with the request, at step 604 the location of the target service is returned (flow 231 of FIG. 2) to the client application (201 of FIG. 2). If detail of the client type was received with the request, at step 605 a check is made to see if behavior characteristics are available for the target service and associated with the client type. If this is not the case the location of the target service is returned to the client application at step 604. However, if behavior characteristics (such as 214 of FIG. 4) are defined these are obtained and added, in a behavior service context as part of the implicit context associated with the response at step 606, before the location of the target service is returned to the client application at step 604.

Figure 7A:
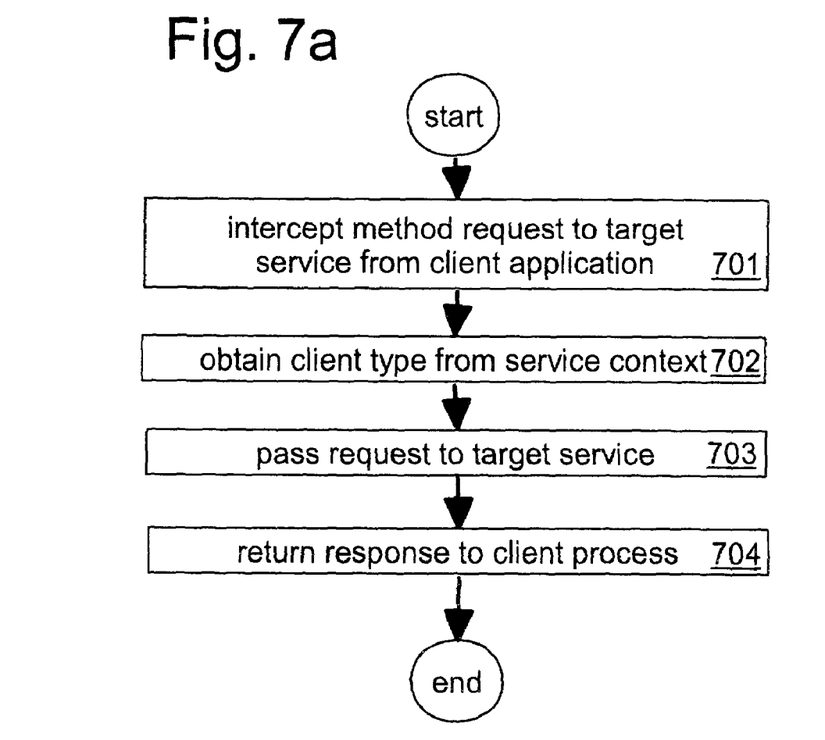
FIGS. 7a and 7b are flow charts of the method followed by server middleware when processing a request for a target service to perform an operation.
Figure 7B:
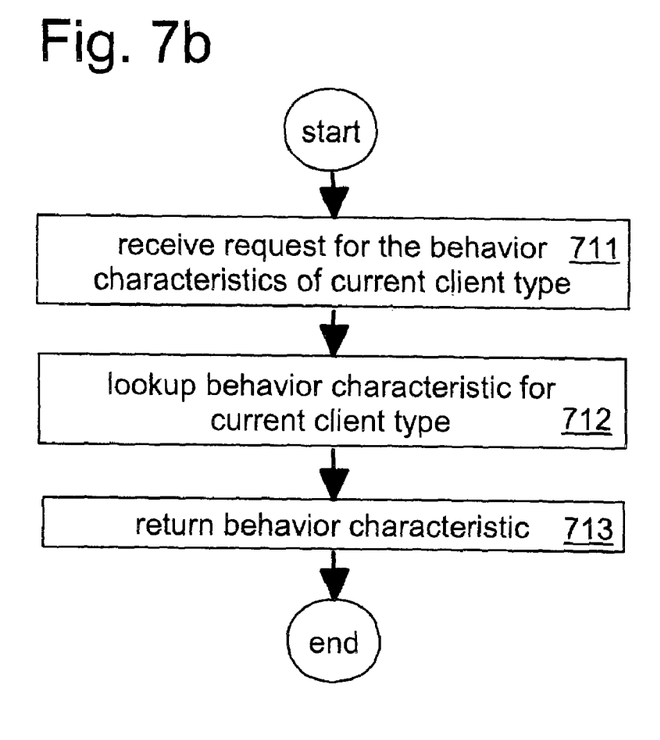

FIGS. 7a and 7b are flow charts of the method followed by the middleware (221 of FIG. 2) of a server process (220 of FIG. 2) in which a request (flow 232 of FIG. 2) for a target service operation (222 of FIG. 2) is received. Referring to FIG. 7a, at step 701 the request to the target service is intercepted and at step 702 detail of the client type is obtained, if it exists, from a service context in the implicit, parameterised context of the request. The request is then delivered to the target service at step 703, and when the target service returns, the response is returned to the client process at step 704.

While the target service is processing the request as a result of the call at step 703 of FIG. 7a, it calls back to the middleware to obtain the behavior characteristics for the current client type. Referring to FIG. 7b, at step 711 the middleware receives a request from the target service for an indication of the behavior characteristic to follow for the current operation based on the current client type. At step 712 the middleware, using the client type obtained at step 702 of FIG. 7a, looks up the behavior characteristics and then returns them to the target service. Note that if no client type was obtained at 702, a null is returned at step 712. Further note that in another embodiment the middleware can simply return the client type to the target service to enable the client service to look up the behavior characteristic to observe.

Thus the methods followed by middleware according to the preferred embodiment of the present invention have been described, these methods being variously distributed over client and servers. There are many suitable languages for implementing these methods, for example, Java or C++.

The preferred embodiments of the present invention thus provide a method, apparatus and computer program product which enables a target service to provide operations which behave, on a per operation basis, in a way appropriate to the type of client that requested the operation to be performed. As a result the target service can provide operations which behave differently for different clients. Further the client can obtain details of the behavior characteristics of the operations, according to its type, at runtime and act appropriately in the event of the request being timed out or resulting in a communication failure. For example, the client middleware can take action to re-issue a timed out request if the behavior characteristic for that operation indicates that multiple invocations of the operation will yield the same result.

What is claimed is:

1. A method for handling client/server requests by a client process, the method comprising:
   intercepting a request from a client application, said request relating to a target service which provides an operation;
   adding a client type identifier, indicating a client type for said client process, to data to be flowed with said request;

intercepting a response to said request, said response including a behavior characteristic parameter, associated with said client type identifier, for said operation, said behavior characteristic parameter indicating whether or not multiple invocations of said operation will yield the same result;

obtaining said behavior characteristic parameter from said response;

intercepting a second request from said client application, wherein the said second request is for said operation;

adding said client type identifier, indicating a client type, to data to be flowed with said second request; and in response to one of receiving a response indicating that a response to said second request will not be received from said target service, or not receiving a response to said second request after a specified time interval:

processing said request according to said behavior characteristic parameter.

2. The method of claim 1 wherein said request is to obtain a location of said target service.

3. The method as claimed in claim 1, wherein processing said second request according to said behavior characteristic comprises:

re-issuing said second request to said target service.

4. The method as claimed in claim 1, wherein processing said second request according to said behavior characteristic comprises:

obtaining a second location of said target service; and re-issuing said second request to said target service at said second location.

5. A method for handling client/server requests by a server process, the method comprising:

receiving a request from a client process, the request relating to a target service and including a client type identifier indicating a client type for said client process;

obtaining a behavior characteristic parameter, associated with said client type identifier, for an operation provided by said target service, said behavior characteristic parameter indicating whether or not multiple invocations of said operation will yield a same result; and adding details of said behavior characteristic parameter for said operation to a response to said request;

intercepting a second request from said client process for said target service to perform said operation;

receiving a request from said target service to obtain information which enables said target service to behave according to said behavior characteristic parameter; and returning said information to said target service.

6. A method according to claim 5, wherein said request is to obtain a location of said target service.

7. A method according to claim 5, wherein said information comprises one of said client type identifier, or an indication of said behavior characteristic parameter.

8. A method for handling a client/server request by a server process, the method comprising:

intercepting a request, from a client process, for a target service to perform an operation;

obtaining a client type identifier indicating a client type for said client process from said request;

receiving a request from said target service to obtain information which enables said target service to behave according to a behavior characteristic parameter for said operation and associated with said client type identifier, said behavior characteristic parameter indicating whether or not multiple invocations of said operation will yield a same result; and returning said information to said target service.

9. The method according to claim 8 wherein said information comprises one of said client type identifier, or an indication of said behavior characteristic parameter.

10. A client data processing apparatus for handling client/server requests, the apparatus comprising:

a processor; and a memory coupled to the processor, wherein the memory comprises instructions which, when executed by the processor, cause the processor to:

intercept a request from a client application, said request relating to a target service which provides an operation;

add a client type identifier, indicating a client type for said client process, to data to be flowed with said request;

intercept a response to said request, said response including a behavior characteristic parameter, associated with said client type identifier, for said operation provided by the target service, said behavior characteristic parameter indicating whether or not multiple invocations of said operation will yield the same result;

obtain said behavior characteristic parameter from said response;

intercept a second request from said client application, wherein said second request is for said operation;

add said client type identifier, indicating a client type, to data to be flowed with said second request; and process, responsive to one of receiving a response indicating that a response to said second request will not be received from said target service, or not receiving a response to said second request after a specified time interval, for processing said request according to said behavior characteristic parameter.

11. The apparatus as claimed in claim 10, wherein said request is to obtain a location of said target service.

12. The apparatus as claimed in claim 10, wherein processing said request according to said behavior characteristic parameter comprises:

re-issuing said request to said target service.

13. The apparatus as claimed in claim 10, wherein processing said request according to said behavior characteristic parameter comprises:

obtaining a second location of said target service; and re-issuing said request to said target service at said second location.

14. A server apparatus for handling client/server requests, the apparatus comprising:

a processor; and a memory coupled to the processor, wherein the memory comprises instructions which, when executed by the processor, cause the processor to:

receive a request from a client process, the request relating to a target service and including a client type identifier indicating a client type for said client process;

obtain a behavior characteristic parameter, associated with said client type identifier, for an operation provided by said target service, said behavior characteristic parameter indicating whether or not multiple invocations of said operation will yield a same result;

add details of said behavior characteristic parameter for said operation to a response to said request;

intercept a second request, from said client process, for said target service to perform said operation;

obtain an identifier which indicates a client type for said client process from said second request;

receive a request from said target service to obtain information which enables said target service to behave according to said behavior characteristic parameter; and return said information to said target service.

15. An apparatus according to claim 14, wherein said request is to obtain a location of said target service.

16. An apparatus according to claim 14 wherein said information comprises one of said client type identifier or an indication of said behavior characteristics parameter.

17. A server apparatus for handling client/server requests, the apparatus comprising:
means for intercepting a request from a client process for a target service to perform an operation;
means for obtaining a client type identifier which indicates a client type for said client process from said request;
means for receiving a request from said target service to obtain information which enables said target service to behave according to a behavior characteristic parameter for said operation and associated with said client type identifier, said behavior characteristic parameter indicating whether or not multiple invocations of said operation will yield a same result; and
means for returning said information to said target service.

18. The apparatus according to claim 17 wherein said information comprises one of said client type identifier or an indication of said behavior characteristic parameter.

19. A computer program product comprising instructions, stored in a non-transitory storage device, which, when executed on a data processing host, cause said host to carry out a method for handling client/server requests by a client process, the method comprising:
intercepting a request from a client application, said request relating to a target service which provides an operation;
adding a client type identifier, indicating a client type for said client process, to data to be flowed with said request;
intercepting a response to said request, said response including a behavior characteristic parameter, associated with said client type identifier, for said operation, said behavior characteristic parameter indicating whether or not multiple invocations of said operation will yield the same result;
obtaining said behavior characteristic parameter from said response;
intercepting a second request from said client application, wherein the said second request is for said operation;
adding said client type identifier, indicating a client type, to data to be flowed with said second request; and
in response to one of receiving a response indicating that a response to said second request will not be received from said target service, or not receiving a response to said second request after a specified time interval:
processing said request according to said behavior characteristic parameter.

20. The computer program product as claim in claim 19, wherein said request is to obtain a location of said target service.

21. The computer program product as claimed in claim 19, wherein processing said request according to said behavior characteristic parameter comprises:
re-issuing said request to said target service.

22. The computer program product as claimed in claim 19, wherein processing said request according to said behavior characteristic parameter comprises:
obtaining a second location of said target service; and
re-issuing said request to said target service at said second location.

23. A computer program product comprising instructions, stored in a non-transitory storage device, which, when executed on a data processing host, cause said host to carry out a method for handling client/server requests by a server process, the method comprising:
receiving a request from a client process, the request relating to a target service and including a client type identifier indicating a client type for said client process;
obtaining a behavior characteristic parameter, associated with said client type identifier, for an operation provided by said target service, said behavior characteristic parameter indicating whether or not multiple invocations of said operation will yield a same result; and
adding details of said behavior characteristic parameter for said operation to a response to said request;
intercepting a second request from said client process for said target service to perform said operation;
receiving a request from said target service to obtain information which enables said target service to behave according to said behavior characteristic parameter; and
returning said information to said target service.

24. A computer program product according to claim 23, wherein said request is to obtain a location of said target service.

25. The computer program product according to claim 23, wherein said information comprises one of said client type identifier, or an indication of said behavior characteristic parameter.

26. A computer program product comprising instructions, stored in a non-transitory storage device, which, when executed on a data processing host, cause said host to carry out a method for handling a client/server request by a server process, the method comprising:
intercepting a request, from a client process, for a target service to perform an operation;
obtaining a client type identifier indicating a client type for said client process from said request;
receiving a request from said target service to obtain information which enables said target service to behave according to a behavior characteristic parameter for said operation and associated with said client type identifier, said behavior characteristic parameter indicating whether or not multiple invocations of said operation will yield a same result; and
returning said information to said target service.

27. The computer program product according to claim 26 wherein said information comprises one of said client type identifier, or an indication of said behavior characteristic parameter.

* * * * *